(12) United States Patent  
Chappell et al.

(10) Patent No.: US 8,381,253 B2  
(45) Date of Patent: Feb. 19, 2013

(54) CONTENT PLACEHOLDER MARKERS

(75) Inventors: Jerry Wayne Chappell, Duluth, GA (US); Mark Matthew Gathen, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 241 days.

(21) Appl. No.: 12/780,116

(22) Filed: May 14, 2010

(65) Prior Publication Data

US 2011/0283313 A1    Nov. 17, 2011

(51) Int. Cl.  
*H04N 7/173*    (2006.01)

(52) U.S. Cl. .......................................... 725/88; 725/89

(58) Field of Classification Search .................... 725/88, 725/89  
See application file for complete search history.

(56) References Cited

U.S. PATENT DOCUMENTS

| 7,765,235 | B2 * | 7/2010 | Day et al. ...................... 707/795 |
| 2005/0251835 | A1 * | 11/2005 | Scott et al. ...................... 725/88 |
| 2008/0046954 | A1 * | 2/2008 | Bhogal et al. ................. 725/134 |
| 2008/0184304 | A1 * | 7/2008 | Ellis et al. ....................... 725/40 |

* cited by examiner

*Primary Examiner* — Brian Pendleton  
*Assistant Examiner* — Olugbenga Idowu  
(74) *Attorney, Agent, or Firm* — Merchant & Gould (57) ABSTRACT

Content placeholder markers may be provided. A request to insert a placeholder marker may be received during output of a content asset to a device. If memory storage is available to record the content asset, the asset may be recorded. Otherwise, the placeholder marker may be stored and/or used to resume playback of the content asset from another source.

20 Claims, 4 Drawing Sheets

CONTENT PLACEHOLDER MARKERS

BACKGROUND

Content placeholder markers are an electronically-implemented process for storing a time location within a content stream. In some situations, users may wish to mark a particular time point within a content stream, such as a television broadcast. In conventional systems, this mark may comprise a pause request resulting in a recording device beginning to record the content stream beginning from the time the user issued the request. This may be impossible if the device being used to process the content stream, such as a cable box, does not have a memory storage for recording the stream or is not configured to record the content stream.

SUMMARY

Consistent with embodiments of the present invention, systems and methods are disclosed for inserting content placeholder markers. A request to insert a placeholder marker may be received during output of a content asset to a device. If memory storage is available to record the content asset, the asset may be recorded. Otherwise, the placeholder marker may be stored and/or used to resume playback of the content asset from another source.

It is to be understood that both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

DETAILED DESCRIPTION

Embodiments of the present invention provide for a method of providing content placeholder markers. Placeholder markers may allow the replication of a content recorders memory buffer on a non-recording capable device, such as a set-top box. It may also be used to store placeholder markers associated with content for future access, such as for On Demand type content. Placeholder markers may allow a user to access a digital video recorder (DVR) feature of being able to pause live TV and may allow users to insert placeholder markers in live video for future access to on demand content. The DVR buffer may be extended into a device, such as a set-top box, without the need to utilize a tuner or hard drive located on a DVR. Placeholder markers may also be used trigger the automated recording of DVR assets.

Content placeholder markers may be available to be placed automatically or manually by a customer's action. This feature may insert a pause marker set in a future on demand asset or in a currently available on demand asset. Some content providers may provide access to an on demand version of a content asset immediately and/or shortly after a live version of the content asset begins transmission. For example, a new episode of a television program may be available in an on demand asset version a few minutes after the episode begins to air and/or shortly after the episode concludes. An example of such a service may comprise the "MYPRIMETIME®" On Demand service offered by COX COMMUNICATIONS, INC., of Atlanta, Ga. Content placeholder markers may also be used for time shifted dynamic ad replacement and ad overlays during playback of the content from local storage on non-DVR set-top boxes or from an on demand asset. For example, resumption of playback of a content asset may be overlaid with a sponsorship message such as "This playback experience brought to you by <Sponsor>."

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

Consistent with embodiments of the invention, content placeholder markers may be provided. The introduction and development of these placeholder markers may grant users additional flexibility in viewing content, such as audio streams and/or television programs. The placeholder markers may grant non-DVR users the ability to time shift live television and may remove the dependency of a DVR hard drive for pausing, fast forwarding, and rewinding live TV. The placeholder markers may also enable the ability for users who have a local DVR to pause live content without a hard drive DVR buffer (e.g., at a non-DVR set-top box) or without needing to use the host DVR's hard drive.

Users may access the placeholder markers through selection of an identified key on a remote control. An onscreen application may indicate how much time has elapsed since the creation of the placeholder marker and how much time is left as eligible space to be paused, if using local storage. The determination on length of available pause may depend on whether the customer has paused standard definition (SD) or high definition (HD) content. Should a user pause a content stream and run out of space, a recording may be set up on a DVR, such as a user's DVR in another room. The user of the set-top box may be notified that a recording has been established and the user may be able to start the recording from the beginning of the content asset and/or the original placeholder request via an onscreen application. If the content is available as an on demand asset, a placeholder indicator may be associated with the on demand asset at a time point where the customer has created the placeholder marker. Should the user resume playback of the asset and pause again, the last placeholder marker may remain indicated in the on demand asset. The user may be able to access the on demand asset beginning from the placeholder marker without the need to start at the beginning of the asset.

Figure 1:
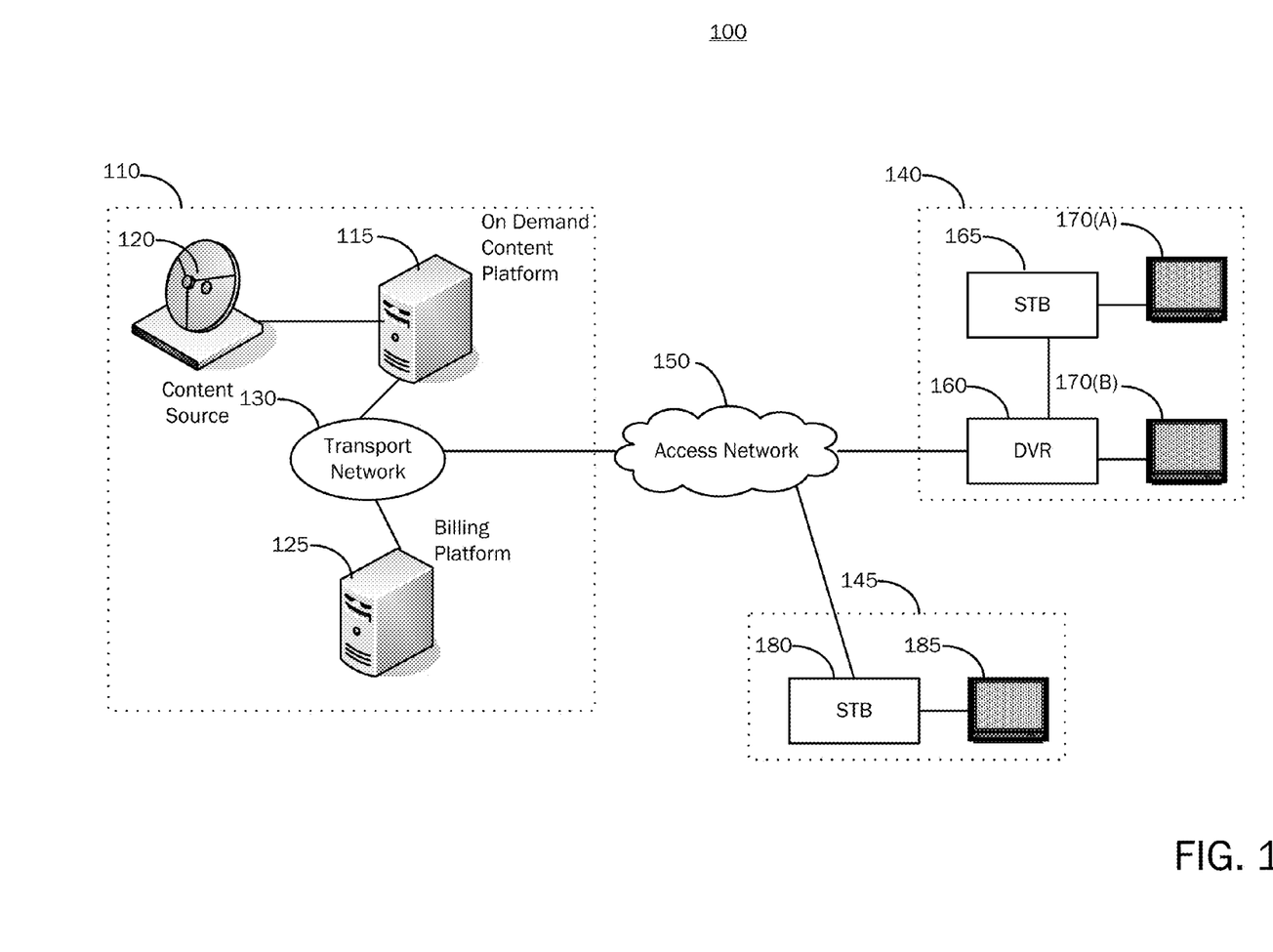
FIG. 1 is a block diagram illustrating an operating environment.

FIG. 1 is simplified block diagram illustrating an operating environment 100 for providing placeholder markers. Operating environment 100 may comprise a content provider 110 (e.g., a cable television service provider), an on demand content platform 115, a content source 120, a billing platform 125, and a transport network 130. Content provider 110 may communicate with a first user premises 140 and/or a second user premises 145 over an access network 150. First user premises 140 may comprise a digital video recorder (DVR) 160, a set-top box (STB) 165, and a plurality of display devices 170(A)-170(B). Second user premises 145 may comprise a second STB 180 coupled to a second user's display device 185.

Content source 120 may comprise, for example, an outside content provider sources, such as a satellite link to a television broadcast network, and/or prepared content recordings, such as video on demand content. On demand content platform 115 may be operative to index available on demand content assets and process requests from first user premises 140 and/or second user premises 145 for on demand content. Transport network 130 may comprise a content provider's internal network, such as a local area network (LAN). Billing platform 125 may be operative to store information associated with customers of content provider 110, such as payment and provisioning information. Access network 150 may comprise a private network, such as a cable television distribution network (e.g., a hybrid fiber-coax network) or a cellular data network and/or a public network such as a metropolitan WiMAX network and/or the Internet. STB 165, second STB 180, and/or DVR 160 may be operative to request content and receive and decode the associated content stream from content provider 110.

Figure 2:
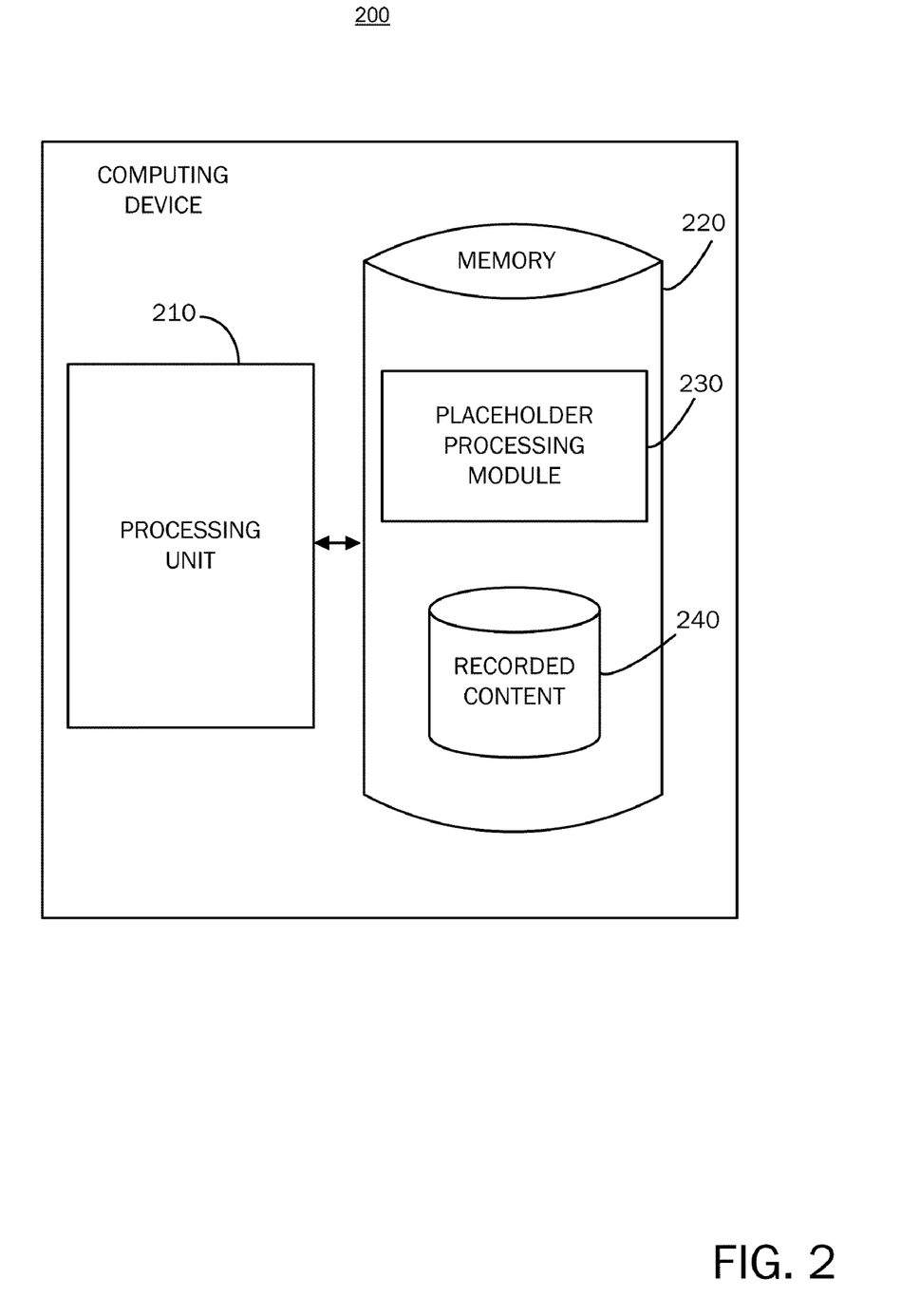
FIG. 2 is a block diagram of a computing device.

FIG. 2 illustrates a computing device 200. Computing device 200 may include a processing unit 210 and a memory unit 220. Memory 220 may include, for example, a placeholder processing software module 230 and a recorded content data store 240. While executing on processing unit 210, placeholder processing software module 230 may perform processes for retrieving, updating, and/or transmitting billing and/or placeholder information, including, for example, one or more stages included in a method 300 described below with respect to FIG. 3. Furthermore, placeholder processing software module 230 may be executed on or reside in any element shown and/or described with respect to FIG. 1. Moreover, any one or more of the stages included in method 300 may be performed on any element shown in FIG. 1.

Computing device 200 may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Figure 3:
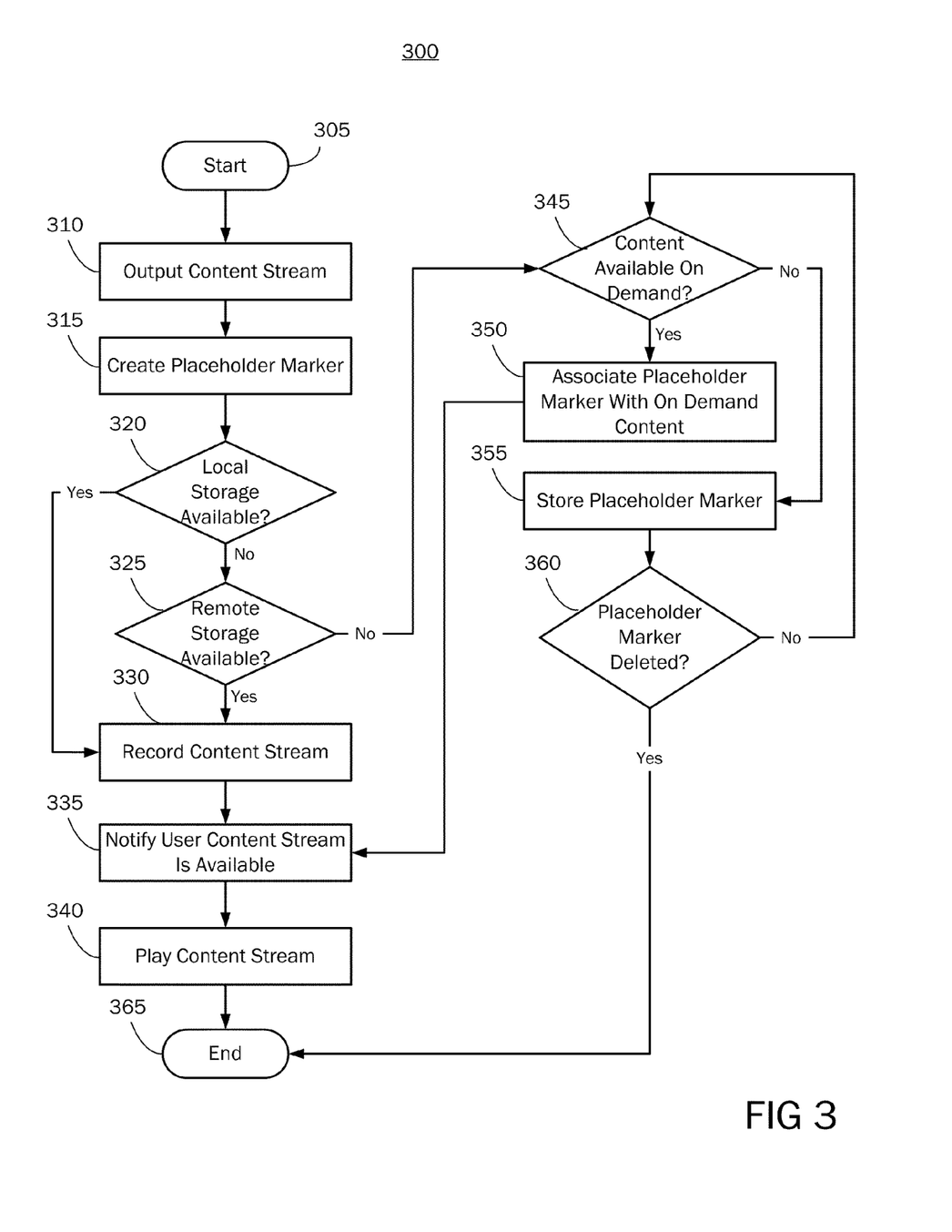
FIG. 3 is a flow chart showing an illustrative routine for providing content placeholder markers.

FIG. 3 is a flow chart setting forth the general stages involved in method 300 consistent with embodiments of the invention for providing content placeholder markers. Method 300 may be implemented using computing device 200 as described in more detail above with respect to FIG. 2. Ways to implement the stages of method 300 will be described in greater detail below. Method 300 may begin at starting block 305 and proceed to stage 310 where computing device 200 may output a content stream. For example, STB 165 may output a television program received from content provider 110 to display device 170(A).

From stage 310, method 300 may advance to stage 315 where computing device 200 may create a placeholder marker. For example, STB 165 may receive a user request via a remote control device to pause output of the content stream. In response, STB 165 may create a placeholder marker associating the user with the content stream and identifying a time within the content stream at which the pause request was received. This content placeholder marker may be stored on a local memory storage of STB 165, relayed to another device within first user premises 140 such as DVR 160, and/or transmitted to content provider 110 for storage, such as on billing platform 125 and/or on demand content platform 115.

From stage 315, method 300 may advance to stage 320 where computing device 200 may determine whether local storage is available for recording the content stream. For example, STB 165 may be coupled to an internal and/or external hard drive, a USB key drive, and/or an internal and/or external flash memory storage device. If so, method 300 may advance to stage 330 where computing device 200 may record the content stream to the local storage, beginning from the time at which the content placeholder marker creation request was received. Consistent with embodiments of the invention, if prior portions of the content stream were buffered in memory, the prior portions may also be included in the recording.

If no local storage is determined to be available at stage 320, method 300 may advance to stage 325 where computing device 200 may determine whether any remote storage is available. For example, STB 165 may determine whether another recording device, such as DVR 160, is locally coupled (i.e., within first user premises 140). Consistent with embodiments of the invention, content provider 110 may offer user-associated storage space located outside of first user premises 140, such as at a facility (e.g., a headend) associated with distributing content. This storage may be considered by computing device 200 when determining whether any remote storage is available. If remote storage is determined to be available, method 300 may advance to stage 330 and record the content to the remote storage, as similarly described above.

From stage 330, method 300 may advance to stage 335 where computing device 335 may notify a user that the content is available for viewing. For example, STB 165 may display an indication on display device 170(A) during and/or after recording of the content stream that the content has been recorded and is available for playback. The displayed indication may comprise, for example, a time when the content may become available if the content is not currently available for viewing.

If the user requests playback of the content, method 300 may advance to stage 340 where computing device 200 may play the content stream. For example, STB 165 may resume playback of the content stream beginning from the earliest recorded point and/or from the time when the request to create the placeholder marker was received. After completion of playback, method 300 may then end at stage 365.

If, at stage 325, computing device 200 determines that no remote storage is available, method 300 may advance to stage 345 where computing device 200 may determine whether the content is available as an on demand asset. For example STB 165 may query content provider 110 to determine whether on demand content platform 115 has the content available as an on demand asset and/or is scheduled to have the content available as an on demand asset. In some embodiments, a first-run content stream may not be made available until after completion of the first-run broadcast. Content provider 110 may treat this situation as having the content asset scheduled for availability as an on demand asset.

Video on Demand (VOD) or Audio Video on Demand (AVOD) are systems that may allow users to select and watch/ listen to video or audio content on demand. Television VOD systems may stream content through a set-top box (e.g., STB 165), allowing viewing in real time, and/or download it to a device such as computing device 200, DVR 160, and/or a portable media player for viewing at any time. Cable- and telco-based television providers (e.g., content provider 110) may offer both VOD streaming, such as pay-per-view, whereby a user buys or selects a movie or television program and it begins to play on the television set almost instantaneously, and/or downloading to a DVR rented from the provider, for viewing in the future. Download and streaming video on demand systems may provide the user with a large subset of VCR functionality including pause, fast forward, fast rewind, slow forward, slow rewind, jump to previous/future frame etc.

If, at stage 345, computing device 200 determines that the content is, and/or will be, available as an on demand asset, method 300 may advance to stage 350 where computing device 350 may associate the placeholder marker with the on demand content asset. For example, STB 165 may store the placeholder marker on a local storage, on storage associated with DVR 160, and/or on storage provided by content provider 110. The placeholder marker may include an identifier of the on demand content asset that may be used to request the on demand asset from content provider 110 at stage 335 and/or stage 340 for requesting and/or retrieving the on demand asset for playback at stage 340. Method 300 may end at stage 365 after completing playback of the on demand asset at stage 340.

If computing device 200 determines that the content is not available as an on demand asset at stage 345, method 300 may advance to stage 355 where computing device 200 may store the placeholder marker for later use. For example, STB 165 may store the placeholder marker on a local storage, on storage associated with DVR 160, and/or on storage provided by content provider 110. Consistent with embodiments of the invention, the placeholder maker may be associated with an account and may be accessed from other display devices. For example, a user may create a placeholder marker while viewing the content on display device 170(A) and may user the placeholder marker to resume viewing the content on display device 170(B).

Method 300 may then advance to stage 360 where computing device 200 may periodically determine whether the placeholder marker has been deleted. For example, a user may delete the placeholder marker from an on screen list using a remote control associated with STB 165. Consistent with embodiments of the invention, placeholder markers may be configured to expire and be deleted by computing device 200 after a certain length of time (e.g., 30, 60, and/or 90 days). If the placeholder marker is determined not to have been deleted, method 300 may return to stage 345 and determine whether the content has become available as an on demand asset. Otherwise, method 300 may end at stage 365.

Figure 4:
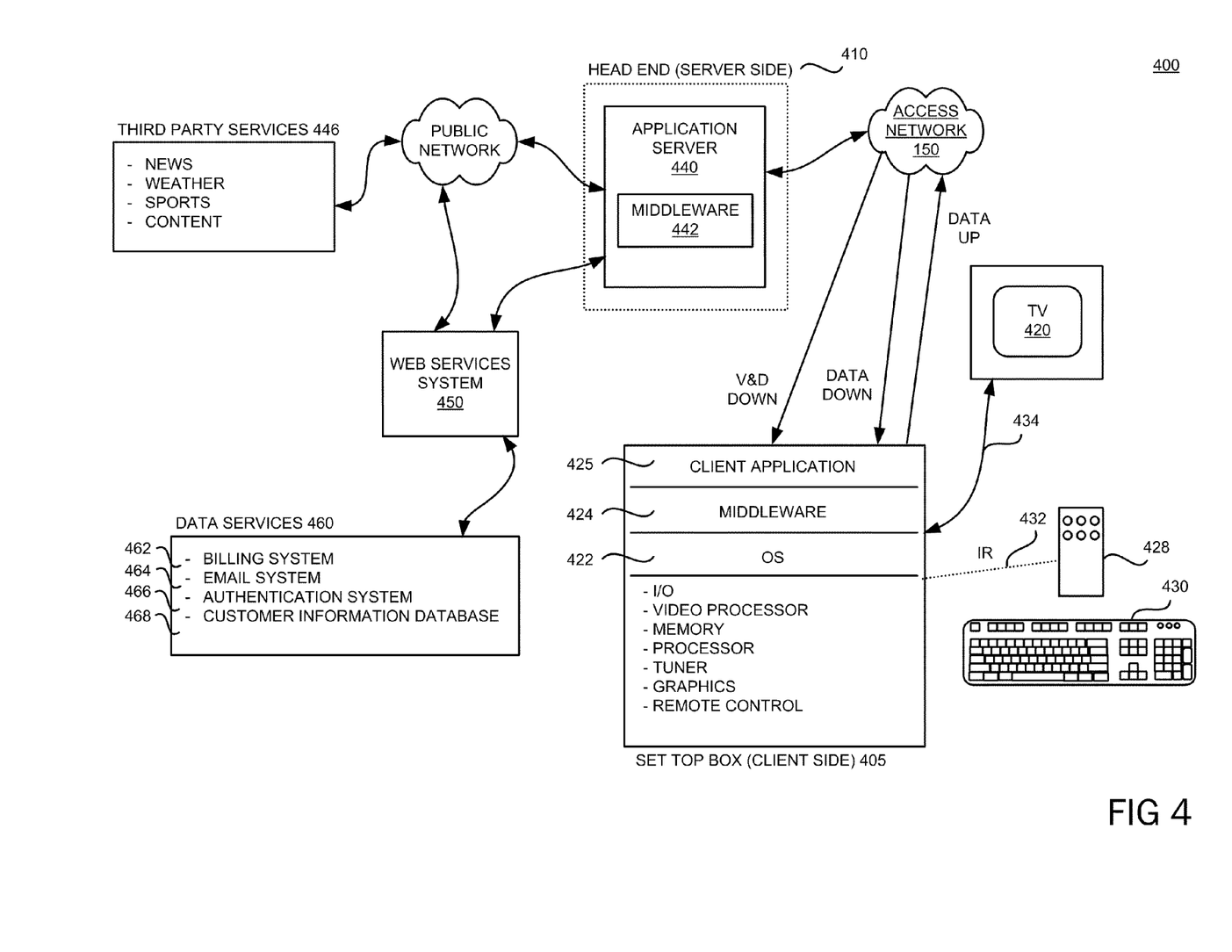
FIG. 4 is a block diagram of a cable television system.

FIG. 4 is a block diagram of a cable television (CATV) system 400 for providing digital and/or analog video programming, information content and interactive television services. These services may be transmitted via access network 150, such as a hybrid fiber coax (HFC) network, to a television set 420 for consumption by a cable television/services system customer. For example, television set 420 may be located at customer premises 200. Access network 150 may combine both optical fiber and coaxial cable lines. In some cases, optical fiber runs from a cable head end 410 to neighborhoods of 500 to 2,000 customers. Coaxial cable runs from the optical fiber feeders to each customer. According to embodiments of the present invention, the functionality of access network 150 allows for efficient bidirectional data flow between a client-side set-top box 405 and a server-side application server 440 of the present invention. Set-top box 405 may comprise a terminal device such as terminal device 165 and/or terminal devices 160, 180.

CATV system 400 may comprise a distributed client-server computing system for providing video and data flow across access network 150 between server-side services providers (e.g., cable television/services providers) via head end 410 and a client-side customer via client-side set-top box (STB) 405 functionally connected to a customer receiving device, such as television set 420. CATV systems 400 may provide a variety of services across access network 150 including traditional digital and analog video programming, telephone services, high speed Internet access, video-on-demand, and information services.

On the client side of CATV system 400, digital and analog video programming and digital and analog data may be provided to television set 420 via set-top box (STB) 405. Interactive television services that allow a customer to input data to CATV system 400 may likewise be provided by STB 405. As illustrated in FIG. 4, STB 405 may comprise a multipurpose computing device having a computer processor, memory and an input/output mechanism. The input/output mechanism may receive input from server-side processes via access network 150 and from customers via input devices such as a remote control device 428 and a keyboard 430. Remote control device 428 and keyboard 430 may communicate with the STB 405 via a suitable communication transport such as an infrared connection 432. STB 405 may also include a video processor for processing and providing digital and analog video signaling to television set 420 via a cable communication transport 434. A multi-channel tuner may be provided for processing video and data to and from STB 405 and head end 410.

STB 405 may also include an operating system 422 for directing the functions of STB 405 in conjunction with a variety of client applications. For example, if a client application 425 requires a news flash from a third-party news source to be displayed on television 420, operating system 422 may cause the graphics functionality and video processor of STB 405, for example, to output the news flash to television 420 at the direction of client application 425 responsible for displaying news items.

Because a variety of different operating systems 422 may be utilized by a variety of different brands and types of set-top boxes, a middleware layer 424 may be provided to allow a given software application to be executed by a variety of different operating systems. According to an embodiment of the present invention, middleware layer 424 may include a set of application programming interfaces (API) that are exposed to client application 425 and operating system 422 that allow client application 425 to communicate with operating system 422 through common data calls understood via the API set. As described below, a corresponding middleware layer may be included on the server side of CATV system 400 for facilitating communication between server-side application server 440 and client-side STB 405. A middleware layer 442 of server-side application server 440 and middleware layer 424 of client-side STB 405 may format data passed between the client side and server side according to the Extensible Markup Language (XML). As should be appreciated, XML is only one example of data formatting, data passed between the client side and the server side may be formatted according to any other suitable formatting language or standard.

According to one embodiment, the set-top box 405 passes digital and analog video and data signaling to the television 420 via a one-way communication transport 434. STB 405 may pass digital and analog video and data signaling to the television 420 via communication transport 434. According to an embodiment, bidirectional communication may be accomplished between the STB 405 and the television 420. For example, high-definition multimedia interface (HDMI) ports on the STB 405 and television 420 allow for bidirectional data communications between the devices. STB 405 may receive video and data from the server side of CATV system 400 via access network 150 through a video/data downlink and data via a data downlink. STB 405 may transmit data from the client side of CATV system 400 to the server side of CATV system 400 via access network 150 via one data uplink. The video/data downlink may comprise an "in band" downlink that allows for digital and analog video and data signaling from the server side of CATV system 400 through access network 150 to set-top box 405 for use by STB 405 and for distribution to television set 420. The "in band" signaling space may operate at a variety of frequencies. According to one embodiment, the "in band" signaling space may operate at a frequency between 54 and 1000 megahertz. The signaling space between 54 and 1000 megahertz may be divided into 6 megahertz channels in which may be transmitted a single analog signal or a greater number (e.g., up to ten) digital signals.

The data downlink and the data uplink, illustrated in FIG. 4, between access network 150 and set-top box 405 may comprise "out of band" data links. The "out of band" frequency range generally lies between zero and 54 megahertz. Data flow between client-side set-top box 405 and server-side application server 440 is typically passed through the "out of band" data links. Alternatively, an "in band" data carousel may be positioned in an "in band" channel into which a data feed may be processed from server-side application server 440 through access network 150 to client-side STB 405. Operation of data transport between components of CATV system 400, described with reference to FIG. 4, is well known to those skilled in the art.

Data passed between CATV system 400 backend components such as head end 410 and CATV system 400 front end components such as STB 405 may be passed according to the Data Over Cable Service Interface Specification (DOCSIS). DOCSIS provides for a mechanism for data transport over a cable system such as CATV 400, illustrated in FIG. 4. Among other things, DOCSIS allows for the passing of digital communications and Internet connectivity over access network 150.

Referring still to FIG. 4, head end 410 of the CATV system 400 may be positioned on the server side of CATV system 400 and may include hardware and software systems responsible for originating and managing content for distributing through access network 150 to client-side STB 405 for presentation to customers via television 420. As described above, a number of services may be provided by CATV system 400, including digital and analog video programming, interactive television services, telephone services, video-on-demand services, targeted advertising, and provision of information content.

Application server 440 may comprise a general-purpose computing system operative to assemble and manage data sent to and received from client-side set-top box 405 via access network 150. As described above with reference to set-top box 405, application server 440 may comprise middleware layer 442 for processing and preparing data from head end 410 of CATV system 400 for receipt and use by client-side set-top box 405. For example, application server 440 via the middleware layer 442 may obtain data from one and/or more of a plurality of third-party services 446 via network 150 for transmitting to a customer through access network 150 and set-top box 405. For example, a weather report from a third-party weather service may be downloaded by application server 440 via network 150. When application server 440 receives the downloaded weather report, middleware layer 442 may be utilized to format the weather report for receipt and use by set-top box 405. Data obtained and managed by middleware layer 442 of application server 440 may be formatted according to the Extensible Markup Language and may be passed to set-top box 405 through access network 150 where the XML-formatted data may be utilized by client application 425 in concert with middleware layer 424, as described above. A variety of third-party services 446 data, including news data, weather data, sports data and other information content may be obtained by application server 440 via distributed computing environments such as network 150 for provision to customers via access network 150 and set-top box 405.

According to embodiments of the present invention, the application server 440 may obtain customer profile data from services provider data services 460 (which may comprise an implementation of profile server 135) for preparing a customer profile that may be utilized by the set-top box 405 for tailoring certain content provided to the customer. According to embodiments of the present invention, a customer profile may include communications applications provisioned on networked STBs, as well as, designations of individual STBs in a home, business or facility (e.g., "kitchen STB," "bedroom STB," "office STB," and the like).

A plurality of provider data services 460 may include a number of services operated by the services provider of CATV system 400 that may include data on a given customer. For example, a billing system 462 may include information such as a customer's name, street address, business identification number, Social Security number, credit history, and information regarding services and products subscribed to by the customer. An electronic mail system 464 may contain information such as electronic mail addresses, high-speed Internet access subscription information and electronic mail usage data. An authentication system 466 may include information such as secure user names and passwords utilized by customers for access to network services. A customer information database 468 may include general information about customers such as place of employment, business address, business telephone number and demographic information such as age, gender, educational level, and the like. As should be understood by those skilled in the art, the disparate data services systems 462, 464, 466, 468 are illustrated as a collection of data services for purposes of example only. The example data services systems comprising data services 460 may operate as separate data services systems, which communicate with a web services system (described below) along a number of different communication paths and according to a number of different communication protocols.

Referring still to FIG. 4, a web services system 450 is illustrated between application server 440 and data services 460. Web services system 450 may serve as a collection point for data requested from each of the disparate data services systems comprising data services 460. When application server 440 requires customer profile data from one or more of data services 460 for preparation or update of a customer profile, application server 440 passes a data query to web services system 450. Web services system 450 formulates a data query to each of the available data services systems for obtaining any available data for a given customer as identified by a set-top box identification associated with the customer. Web services system 450 may serve as an abstraction layer between the various data services systems and application server 440. That is, application server 440 is not required to communicate with the disparate data services systems, nor is application server 440 required to understand the data structures or data types utilized by the disparate data services systems. Web services system 450 may be operative to communicate with each of the disparate data services systems for obtaining necessary customer profile data. The customer profile data obtained by the web services system is assembled and is returned to application server 440 for ultimate processing via middleware layer 442, as described above.

An embodiment consistent with the invention may comprise a system for providing a content placeholder. The system may comprise a memory storage and a processing unit coupled to the memory storage. The processing unit may be operative to output a content asset to an output device, receive a user request to insert at least one content placeholder marker, determine whether a memory storage is available to record the content asset, and, if so, record the content asset. If the memory storage is not available, the processing unit may be operative to store the content placeholder on a local storage and/or on a memory storage associated with another system. For example, the content placeholder may be stored on billing platform 125. The content asset may comprise, for example, an audio asset output to a speaker and/or a video asset output to a display device. The content asset may be a first-run content stream (e.g., a new episode of a television series) or a pre-recorded asset such as an on demand movie. The content placeholder may comprise a user identifier, an asset identifier associated with the content asset, and a time associated with a time within the outputting of the content asset at which the user request was received (e.g., when the user paused the output of the content asset). Recording of the asset may begin at the time the request to create the placeholder was received and/or begin at the beginning of the content asset.

If the memory storage is not available to record the content asset, the processing unit may be operative to determine whether the content asset is available as an on demand asset from the content provider and, if so, request the on demand asset from the content provider. The processing unit may be operative to output the on demand asset beginning from the time at which the request to pause output of the content asset was received and/or the beginning of the on demand asset.

Another embodiment consistent with the invention may comprise a system for creating a content placeholder marker. The system may comprise a memory storage and a processing unit coupled to the memory storage. The processing unit may be operative to display a video content stream on a display device, receive a request from a user to create a placeholder marker associated with a time within the video content stream, and determine whether a memory storage is available for recording the video content stream. If so, the processing unit may be operative to record the video content stream to the memory storage. Otherwise, the processing unit may determine whether the video content stream is available as an on demand asset and, if so, create a stored placeholder marker associated with the user and the on demand asset. The processing unit may be further operative to display a notification to the user that the video content stream is available as the on demand asset, receive a request from the user to begin displaying the video content stream, and display the video content stream on the display device beginning from the stored placeholder marker.

Yet another embodiment consistent with the invention may comprise a system for providing a content placeholder. The system may comprise a memory storage and a processing unit coupled to the memory storage. The processing unit may be operative to display a video content stream on a display device, insert a placeholder mark in the video content stream, determine whether the memory storage comprises a sufficient amount of free space to record the video content stream, and, if so, record the video content stream. Otherwise, the processing unit may be further operative to determine whether a recording device is locally coupled to the system and instruct the recording device to record the video content stream. If no recording device is locally coupled to the system, the processing unit may determine whether a provider of the video content stream offers the video content stream in an on demand format and transmit the placeholder marker to the content provider for associated with the video content stream in the on demand format. The processing unit may be operative to insert the placeholder marker in response to receiving a pause request from a user and/or in response to detecting that the display device is no longer displaying the video content (e.g., the user has changed channels, changed video sources, and/or turned off the display device). The processing unit may be further operative to display a notification to the user that the video content stream is available in the on demand format, receive a request from the user to resume display of the video content stream, request the video content stream from the provider in the on demand format, retrieve the placeholder marker transmitted to the provider and associated with the video content stream, and display the video content stream on the display device beginning from the placeholder marker. The processing unit may also be operative to, in response to determining that the provider of the video content stream does not offer the video content stream in the on demand format, store the placeholder marker in the memory storage and periodically determine whether the video content stream has become available from the provider in the on demand format.

As described herein, methods and systems are provided for creating and storing content placeholders used to record and retrieve content streams. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for providing a content placeholder, the method comprising:
   outputting a content asset to an output device;
   receiving a user request to insert at least one content placeholder marker;
   determining whether a memory storage is available to record the content asset;
   in response to determining that the memory storage is available to record the content asset, recording the content asset;
   in response to determining that the memory storage is not available to record the content asset, determining whether the content asset is available as an on demand asset;
   in response to determining that the content asset is not available as an on demand asset, storing the at least one content placeholder;
   determining at a subsequent time whether the content asset is available as an on demand asset; and
   in response to determining at the subsequent time that the content asset is available as an on demand asset, creating a stored placeholder marker associated with the user and the on demand asset.

2. The method of claim 1, wherein the content asset comprises an audio asset and the output device comprises at least one speaker.

3. The method of claim 1, wherein the content asset comprises a video asset and the output device comprises a display device.

4. The method of claim 1, wherein the content asset comprises a first-run content stream transmitted by a content provider.

5. The method of claim 1, wherein the at least one content placeholder comprises a user identifier, an asset identifier associated with the content asset, and a time associated with the time within the outputting of the content asset at which the user request was received.

6. The method of claim 1, wherein the user request comprises a request to pause output of the content asset.

7. The method of claim 6, wherein recording the content asset begins at a time within the outputting of the content asset at which the user request was received.

8. The method of claim 6, further comprising:
in response to determining that the memory storage is available to record the content asset, determining whether a previously output portion of the content asset is stored in the memory storage; and
in response to determining that the previously output portion of the content asset is stored in the memory storage, recording the content asset from an earliest point of the previously output portion of the content asset stored in the memory storage.

9. The method of claim 6, further comprising:
in response to determining that the memory storage is not available to record the content asset, determining whether the content asset is available as an on demand asset from a content provider associated with providing the content asset; and
in response to determining that the content asset is available as an on demand asset from the content provider associated with providing the content asset, requesting the on demand asset from the content provider.

10. The method of claim 9, further comprising:
receiving a second user request comprising a request to resume outputting the content asset; and
outputting the on demand asset requested from the content provider beginning from a time within the outputting of the content asset at which the request to pause output of the content asset was received.

11. A method for creating a content placeholder marker, comprising:
displaying a video content stream on a display device;
receiving a request from a user to create a placeholder marker associated with a time within the video content stream;
determining whether a memory storage is available for recording the video content stream;
in response to determining that the memory storage is available for recording the video content stream, recording the video content stream to the memory storage;
in response to determining that the memory storage is not available for recording the video content stream, determining whether the video content stream is available as an on demand asset;
in response to determining that the video content stream is available as an on demand asset, creating a stored placeholder marker associated with the user and the on demand asset
in response to determining that the video content stream is not available as an on demand asset, storing the placeholder marker;
in response to storing the placeholder marker, determining at a subsequent time whether the video content stream is available as an on demand asset; and
in response to determining at the subsequent time whether the video content stream is available as an on demand asset, creating the stored placeholder marker associated with the user and the on demand asset.

12. The method of claim 11, wherein recording the video content stream comprises being operative to record an entirety of the video content stream.

13. The method of claim 11, wherein recording the video content stream comprises being operative to record a remainder of the video content stream beginning at the time within the video content stream associated with the placeholder marker.

14. The method of claim 11, further comprising:
displaying a notification to the user that the video content stream is available as the on demand asset;
receiving a request from the user to begin displaying the video content stream; and
displaying the video content stream on the display device beginning from the stored placeholder marker.

15. The method of claim 11, wherein creating the stored placeholder marker associated with the user comprises storing the placeholder marker on an account system associated with a provider of the video content stream as an on demand asset.

16. A system for providing a content placeholder, the system comprising:
a memory storage; and
a processing unit coupled to the memory storage, wherein the processing unit is operative to:
display a video content stream on a display device,
insert a placeholder marker in the video content stream,
determine whether the memory storage comprises a sufficient amount of free space to record the video content stream,
in response to determining that the memory storage comprises the sufficient amount of free space to record the video content stream, record the video content stream,
in response to determining that the memory storage does not comprise the sufficient amount of free space to record the video content stream,
determine whether a recording device is locally coupled to the system,
in response to determining that the recording device is locally coupled to the system, instruct the recording device to record the video content stream,
in response to determining that the recording device is not locally coupled to the system, determine whether a provider of the video content stream offers the video content stream in an on demand format,
in response to determining that the provider of the video content stream offers the video content stream in the on demand format, transmit the placeholder marker to a content provider for association with the video content stream in the on demand format,
in response to determining that the provider of the video content stream does not offer the video content stream in the on demand format, store the placeholder marker, in response to storing the placeholder marker, determine at a subsequent time whether the provider of the video content stream offers the video content stream in an on demand format, and in response to determining at the subsequent time whether the video content stream is available as an on demand asset, transmit the placeholder marker to the content provider for association with the video content stream in the on demand format.

17. The system of claim 16, wherein the processing unit is operative to insert the placeholder marker in response to receiving a pause request from a user.

18. The system of claim 16, wherein the processing unit is operative to insert the placeholder marker in response to the display device no longer displaying the video content.

19. The system of claim 16, wherein the processing unit is further operative to:

display a notification to the user that the video content stream is available in the on demand format;

receive a request from the user to resume display of the video content stream;

request the video content stream from the provider in the on demand format;

retrieve the placeholder marker transmitted to the provider and associated with the video content stream; and display the video content stream on the display device beginning from the placeholder marker.

20. The system of claim 16, wherein the processing unit is further operative to:

in response to determining that the provider of the video content stream does not offer the video content stream in the on demand format, store the placeholder marker in the memory storage; and periodically determine whether the video content stream has become available from the provider in the on demand format.

* * * * *

UNITED STATES PATENT AND TRADEMARK OFFICE
CERTIFICATE OF CORRECTION

| | | |
|---|---|---|
| PATENT NO. | : 8,381,253 B2 | Page 1 of 1 |
| APPLICATION NO. | : 12/780116 | |
| DATED | : February 19, 2013 | |
| INVENTOR(S) | : Chappell et al. | |

It is certified that error appears in the above-identified patent and that said Letters Patent is hereby corrected as shown below:

In the Claims

Col. 11, line 67, claim 11: "demand asset" should read --demand asset;--

Signed and Sealed this
Eighteenth Day of March, 2014

Michelle K. Lee
*Deputy Director of the United States Patent and Trademark Office*